US012749791B2

(12) United States Patent
Liu et al.

(10) Patent No.: US 12,749,791 B2
(45) Date of Patent: Sep. 29, 2026

(54) HEATSINK FOR CONFORMAL ANTENNA ASSEMBLY

(71) Applicant: Harman International Industries, Incorporated, Stamford, CT (US)

(72) Inventors: Xuelin Liu, Kunshan City (CN); Huijing Yao, Shanghai (CN); Hao Xu, Shanghai (CN); Hao Liu, Fremont, CA (US); Havent Chen, Shanghai (CN)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 120 days.

(21) Appl. No.: 18/667,998

(22) Filed: May 17, 2024

(65) Prior Publication Data

US 2025/0357655 A1 Nov. 20, 2025

(51) Int. Cl.

| | |
|---|---|
| ***H01Q 1/02*** | (2006.01) |
| ***H01Q 1/32*** | (2006.01) |
| ***H01Q 1/44*** | (2006.01) |
| ***H01Q 21/28*** | (2006.01) |

(52) U.S. Cl.

CPC ............. *H01Q 1/02* (2013.01); *H01Q 1/3233* (2013.01); *H01Q 1/3275* (2013.01); *H01Q 1/44* (2013.01); *H01Q 21/28* (2013.01)

(58) Field of Classification Search

CPC ...... H01Q 1/02; H01Q 1/3233; H01Q 1/3275; H01Q 1/44; H01Q 21/28

See application file for complete search history.

(56) References Cited

U.S. PATENT DOCUMENTS

2022/0369449 A1* 11/2022 Klein ................. H05K 7/20445
2023/0198553 A1* 6/2023 Kim ....................... H01Q 9/045 370/329
2025/0105497 A1* 3/2025 Kim ..................... H01Q 1/1214

OTHER PUBLICATIONS

"Harman Delivers Future-Ready Vehicle Connectivity with the New 5G-Enabled Harman TBOT," Harman News Website, Available Online at https://news.harman.com/releases/harman-delivers-future-ready-vehicle-connectivity-with-the-new-5g-enabled-harman-tbot, Jan. 7, 2021, 2 pages.

Intelligent Antenna Module, Wayback Machine Internet Archive Website, Origianlly Posted on Continental Automotive Website, Available Online at https://web.archive.org/web/20220118230819/https://www.continental-automotive.com/en-gl/Passenger-Cars/Architecture-and-Networking/5G-Connectivity-Solutions/Intelligent-Antenna-Modules, Available as Early as Jan. 18, 2022, 3 pages.

* cited by examiner

*Primary Examiner* — Robert Karacsony
(74) *Attorney, Agent, or Firm* — McCoy Russell LLP

(57) ABSTRACT

Systems are disclosed herein for a conformal antenna assembly including an antenna heatsink for maintaining a temperature of one or more components of the antenna assembly below a threshold temperature. The antenna assembly includes a printed circuit board (PCB) assembly including a PCB and one or more electrical components mounted thereon, a network access device (NAD) module soldered to the PCB, and an antenna heatsink including a first antenna integrally formed with a heatsink, wherein the antenna heatsink is coupled to a first side of the PCB via clips and coupled to the NAD module via a first thermal adhesive layer interposed therebetween.

6 Claims, 11 Drawing Sheets

HEATSINK FOR CONFORMAL ANTENNA ASSEMBLY

TECHNICAL FIELD

The present description relates generally to a heatsink for a conformal antenna assembly.

BACKGROUND

One or more antennae may be included in an antenna system of a telematics unit in a vehicle electronics system for wireless communication between the vehicle and external devices. The antenna system may be part of a conformal antenna assembly which is mounted inside a roof of the vehicle such that the antenna system may be positioned within or underneath the roof. The antenna system may include a network access device (NAD) module subject to high temperatures due at least in part to high power throughput. Excessive heating of the NAD module and/or one or more other components of the antenna system exceeding a threshold temperature (e.g., 105° C.) may impede function and/or cause degradation thereof.

SUMMARY

Embodiments are disclosed for a conformal antenna assembly with an integrated antenna heatsink for reducing a temperature of one or more components of the conformal antenna assembly, such as a network access device (NAD) module, in order to reduce a likelihood of degradation due to excessive heating. In one of a number of embodiments, a conformal antenna assembly comprises: a printed circuit board (PCB) assembly comprising a PCB and one or more electrical components mounted thereon; a network access device (NAD) module soldered to the PCB; and an antenna heatsink comprising a first antenna integrally formed with a heatsink, the antenna heatsink coupled to a first side of the PCB via clips and coupled to the NAD module via a first thermal adhesive layer interposed therebetween, wherein the clips include grounding clips and feed clips.

In this way, heat may be drawn from the NAD module via the antenna heatsink. The grounding clips may be placed strategically to allow for electrical tuning of the antennae. Further, coupling the heatsink to the NAD module may be advantageous due to the high power demands of the NAD module causing more heat to accumulate therein than other components which receive less power throughput.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

The disclosure may be better understood from reading the following description of non-limiting embodiments, with reference to the attached drawings, wherein below.

DETAILED DESCRIPTION

Figure 1:
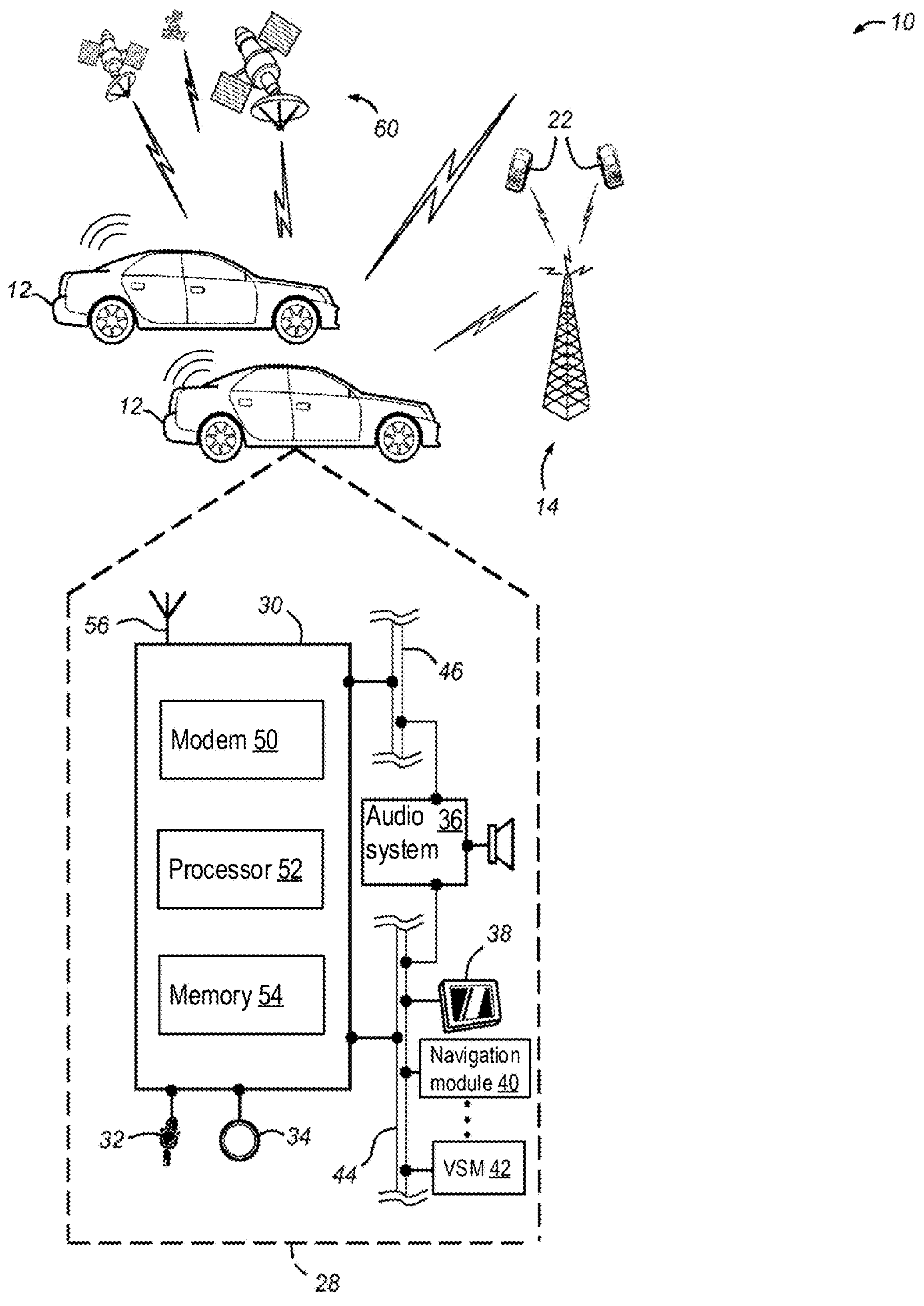
FIG. 1 shows a schematic depicting an example inter-vehicle communications system in accordance with one or more embodiments of the present disclosure.

Embodiments of the present application are described in detail below, and examples of the embodiments are illustrated in the accompanying drawings, wherein the same or similar reference numerals indicate the same or similar components or components having the same or similar functions. The embodiments described below by reference to the accompanying drawings are exemplary and are intended only to explain the present application and are not to be construed as limiting the present application.

The following description relates to systems for an antenna assembly (e.g., a conformal antenna assembly) with an integrated antenna heatsink for maintaining the temperature of one or more components of the antenna assembly (e.g., a network access device (NAD) module) below a threshold temperature above which degradation of electrical components may occur. Thus, the antenna heatsink disclosed herein may protect the one or more components from overheating above the threshold temperature. The one or more components of the antenna assembly may therefore be adapted to receive higher power (which generates more heat) than components of other conformal antenna assemblies may be suitable for.

As described above, telematics systems are used to provide telecommunications and cellular connectivity for vehicles. The present disclosure describes an antenna assembly (e.g., a conformal antenna) which may be incorporated into a telematics system of a vehicle to establish communication between the vehicle and other vehicles in the same or similar geographic area or external services via a relay tower or base station. A communications system, such as the system depicted in FIG. 1, shows one such example of a system capable of providing communication between a vehicle and external services.

Figure 10:
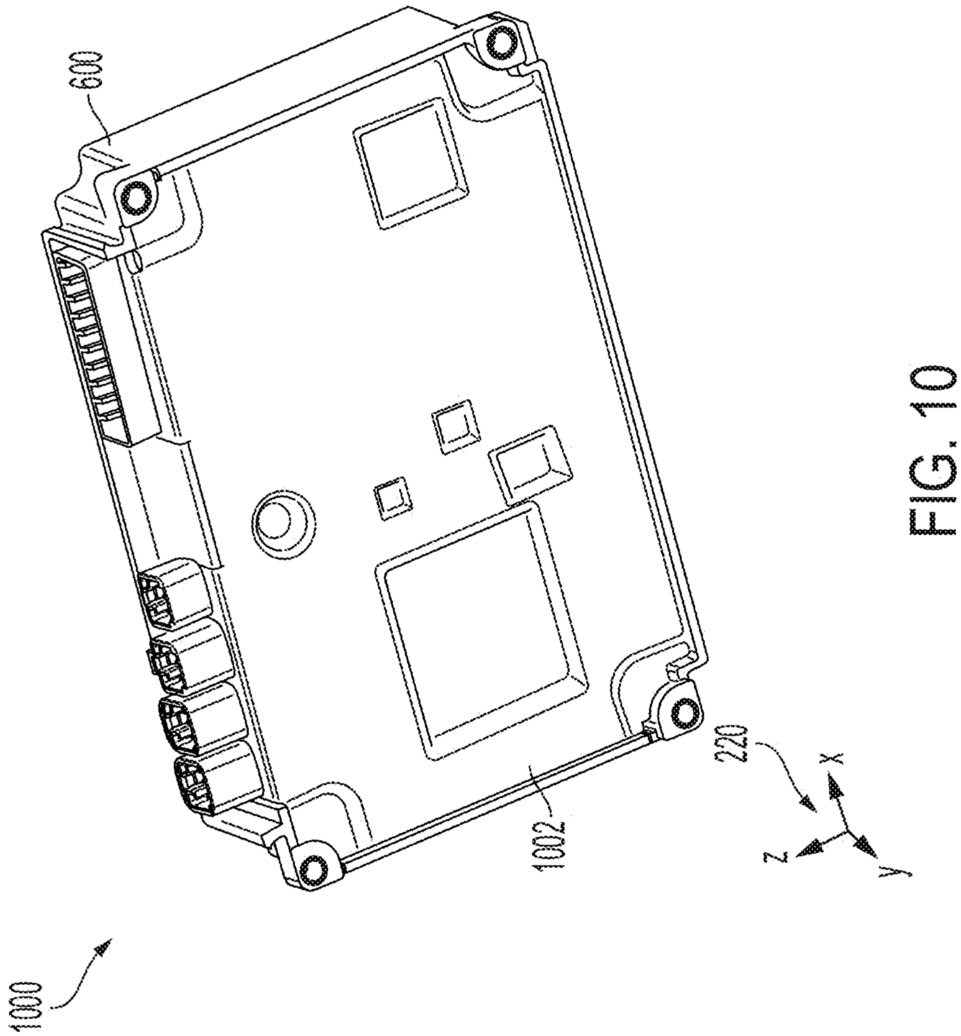
FIG. 10 shows a second view of the antenna assembly in accordance with one or more embodiments of the present disclosure.
Figure 11:
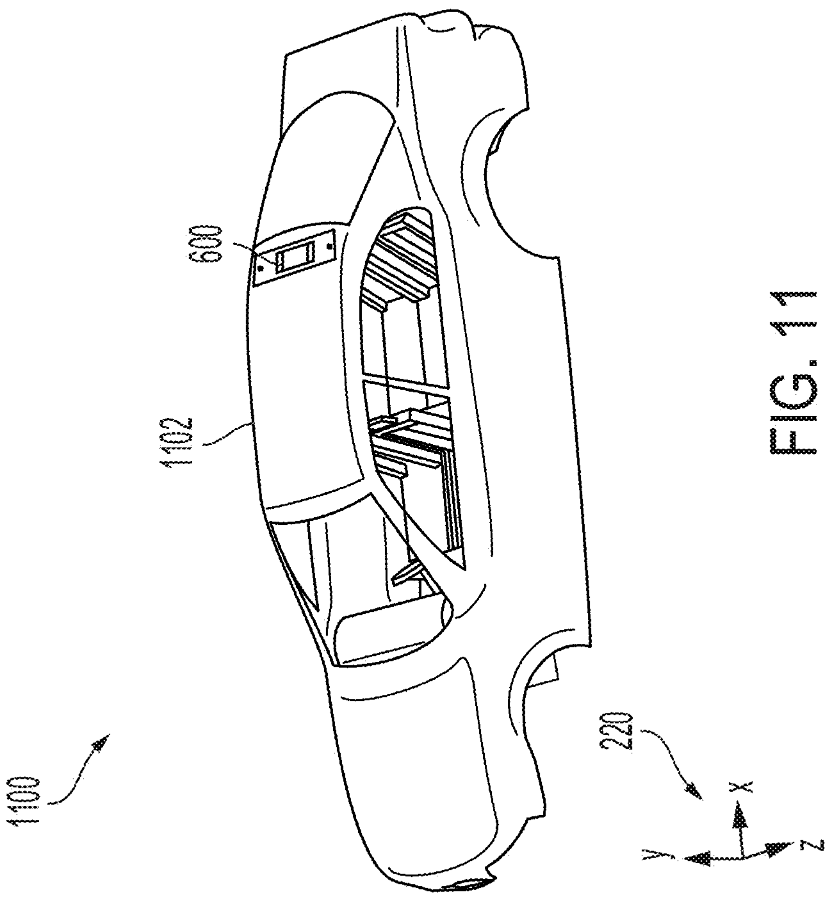
FIG. 11 shows an example of the antenna assembly positioned in a roof of a vehicle.

The antenna assembly disclosed herein may be a conformal antenna integrated inside the vehicle rather than being provided as a sharkfin antenna protruding from the roof of the vehicle. Further, rather than an external mounting position, the antenna assembly may be mounted inside the roof of the vehicle, for example. An example of the antenna assembly positioned in a roof of a vehicle is shown in FIG. 11. An electrical configuration demanded for such a position may increase power through one or more components of the antenna assembly, leading to temperatures great enough to degrade the components. Thus, the conformal antenna assembly disclosed herein may include an antenna heatsink adapted to more effectively draw heat from one or more components of the antenna assembly (e.g., an NAD module or other module) and consequently reduce a temperature thereof. For example, the temperature of the one or more components may be maintained below a threshold temperature (e.g., 105 degrees C.) to prevent degradation due to overheating. Further details as to the antenna assembly are provided in regards to FIGS. 2-10 below.

With reference to FIG. 1, an exemplary operating environment is shown that comprises an inter-vehicle communications system 10 including one or more telematics-equipped vehicles 12. In some examples, the inter-vehicle communications system 10 may additionally include various personal wireless devices 22, remote servers, wireless carrier systems 14, and the like. The following paragraphs simply provide a brief overview of one possible configuration for providing wireless communication between each of the vehicles 12, and between the vehicles 12 and external services. It should be appreciated that other systems not shown here may include the antenna assembly disclosed herein.

Vehicles 12 are depicted in the illustrated embodiment as passenger cars, but it should be appreciated that any other vehicle including motorcycles, trucks, sports utility vehicles (SUVs), recreational vehicles (RVs), marine vessels, aircraft, etc., can also be used. Some of the vehicle electronics 28 are shown generally in FIG. 1. The vehicle electronics 28 may include one or more of a telematics unit 30, a microphone 32, one or more pushbuttons or other control inputs 34, an audio system 36, a visual display 38, and a navigation module 40 as well as a number of vehicle system modules (VSMs) 42.

Telematics unit 30 may be an OEM-installed or aftermarket device that enables vehicles 12 to receive and/or transmit wireless signals corresponding to voice, text, and/or other data. Thus, telematics unit 30 may send and/or receive wireless signals (e.g., electromagnetic waves). Telematics unit 30 may therefore be referred to as transceiver 30, since it may be capable of both sending and receiving wireless signals. Wireless signals produced by the telematics unit 30 of vehicles 12 may be sent to and received by one or more of the vehicles 12 and external systems such as remote servers. Thus, each of the vehicles 12 may be in wireless communication with one another for sending and/or receiving information there-between via the telematics unit 30. Further, each of the vehicles 12 may be in wireless communication with external services and devices such as the personal wireless devices 22 and wireless carrier systems 14 for sending and/or receiving information therebetween. Additionally or alternatively, communications system 10 may utilize satellite communications to provide uni-directional or bi-directional communication between one or more of the vehicles 12 and external systems, such as remote servers, by using one or more communication satellites 60.

As such, each of the vehicles 12 may communicate with other telematics-equipped vehicles 12, or some other entity or device capable of transmitting and/or receiving wireless signals. Telematics unit 30 may enable the vehicle to offer a number of different services including those related to messaging, navigation, telephony, emergency assistance, diagnostics, infotainment, and so on.

According to one embodiment, telematics unit 30 utilizes a wireless modem 50 for data transmission, an electronic processor 52, one or more digital memory devices 54, and one or more antennae 56. Telematics unit 30 may further include an antenna heatsink according to the present disclosure as further described with reference to FIGS. 2, 4, and 7. It should be appreciated that the modem 50 can either be implemented through software or it can be a separate hardware component located internal or external to telematics unit 30. Wireless networking between the vehicles 12 and other networked devices can also be carried out using telematics unit 30. For this purpose, telematics unit 30 can be configured to communicate wirelessly according to one or more wireless protocols.

Telematics unit 30 can be used to provide a diverse range of vehicle services that involve wireless communication to and from the vehicles 12. Such services can include: remote control of certain vehicle features; turn-by-turn directions and other navigation-related services provided in conjunction with the navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the exemplary telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicles 12, to cite but a few possibilities.

Figure 2:
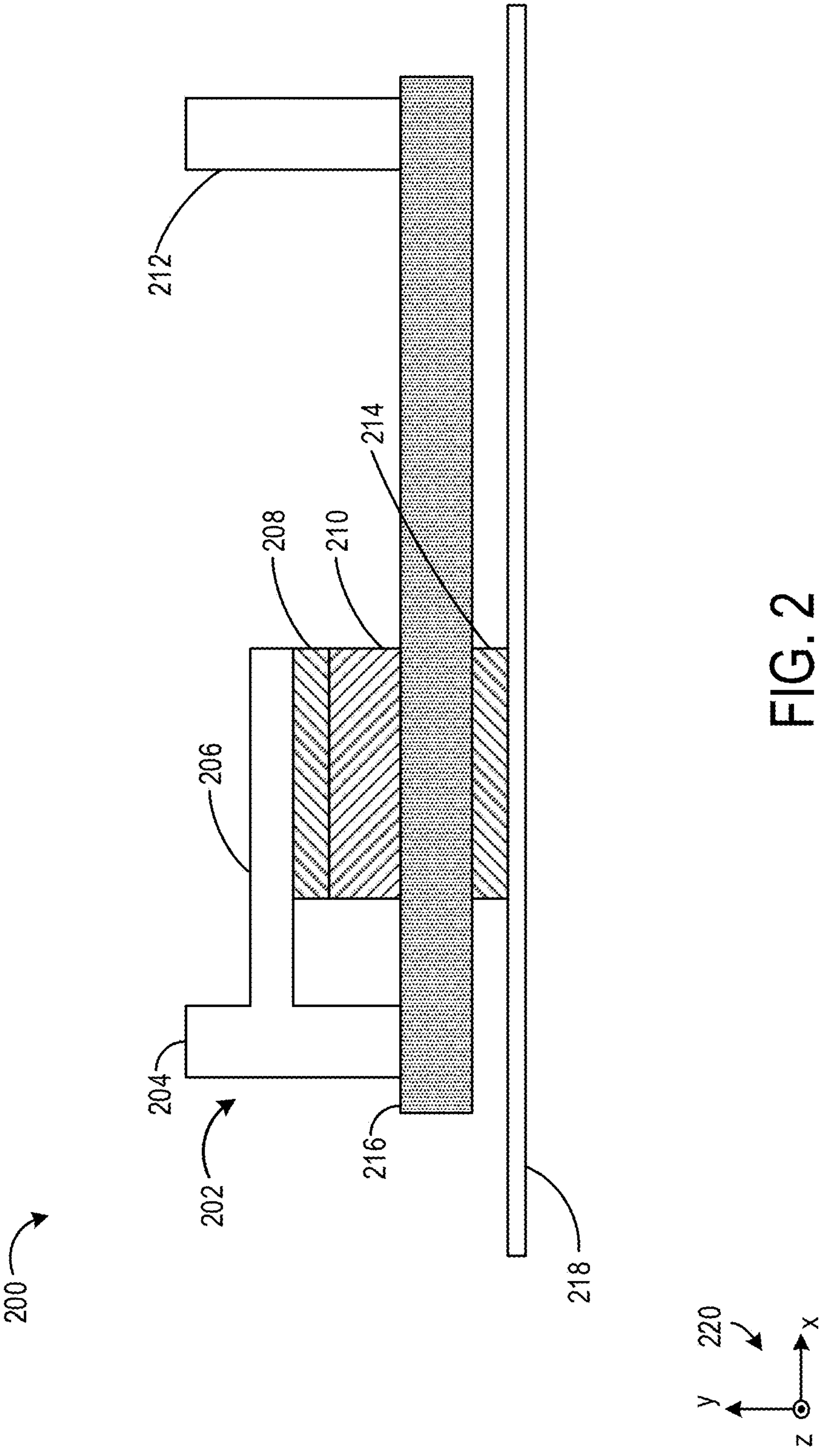
FIG. 2 shows a schematic depicting an antenna system in accordance with one or more embodiments of the present disclosure.

In some examples, the antennae 56 of the telematics unit 30 may include one or more antennae, wherein at least one of the one or more antennae is integrated with a heatsink to form an antenna heatsink (e.g., the antenna heatsink 202 of FIG. 2, the antenna heatsink 802 of FIG. 8, the antenna heatsink 700 of FIG. 7, the antenna heatsink 402 of FIG. 4) according to the present disclosure configured to more effectively remove heat from an NAD module or other module which may receive high power therethrough, such as NAD module 210 of FIG. 2.

Turning to FIG. 2, a schematic depicts an antenna system 200 of a telematics unit, including one or more antennae, such as the antennae 56 of the telematics unit 30 in FIG. 1. FIG. 2 also shows a set of reference axes 220, including an x-axis, a y-axis, and a z-axis. For example, the y-axis may be a vertical axis and the x- and z-axes may be horizontal axes. Additionally or alternatively, the y-axis may be approximately parallel with a direction of gravity and the x- and z-axes may be approximately perpendicular to a direction of gravity. Additionally or alternatively, the y-axis may be a stacking axis along which components are layered perpendicularly as described further below. The reference axes 220 are further shown in FIGS. 3-11 for comparison of orientations of depicted components.

The antenna system 200 may include one or more antennae. For example, the antenna system 200 may comprise a first antenna 204 and a second antenna 212. In at least some examples, the second antenna 212 is a main antenna and the first antenna 204 is a diversity antenna. However, in other examples, the first antenna 204 and the second antenna 212 may perform additional or alternative functions. Further, in some examples, there may be three or more antennae in an antenna system of the present disclosure, as described further below. The first antenna 204 and the second antenna 212 may be spaced apart and mounted to a printed circuit board (PCB) of a PCB assembly (PCBA) 216. The PCBA 216 may include one or more components (e.g., the components shown in FIG. 3) electrically coupled to and mounted on the PCB. Further details of examples of the PCBA 216 are provided in FIGS. 3, 4, and 9 and described further below. The PCB may be secured to a base heatsink 218 via a first thermal adhesive layer 214 interposed therebetween such that heat may be transferred therebetween. There may also be an airgap between the PCBA 216 and the base heatsink 216. For example, the first thermal adhesive layer 214 may comprise a thermally conductive adhesive material. An example of the base heatsink 218 is shown in FIG. 10 and described further below.

A network access device (NAD) module 210 may be soldered and electrically coupled to the PCB (e.g., via surface-mount technology (SMT)). The NAD module 210 may facilitate connection between a vehicle (e.g., the vehicle 12 of FIG. 1) and external networks and communications systems (e.g., the remote servers 16 of FIG. 1). For example, the NAD module 210 may be a modem such as the modem 50 of FIG. 1. In alternative examples, the NAD module 210 may be any other type of device which allows for wireless connection between the vehicle and external networks. The NAD module 210 may be spaced apart from the second antenna 212. In one or more conventional antenna assembly examples, the NAD module 210 may further be spaced away from the first antenna 204. In contrast with such an example, the first antenna 204 may be integrally formed with a heatsink 206 protruding therefrom and coupled to the NAD module 210 via a second thermal adhesive layer 208 interposed between the heatsink 206 and the NAD module 210. For example, the first antenna 204 may extend vertically from the PCBA 216 and the heatsink 206 may extend laterally from the first antenna 204. The first antenna 204 and the heatsink 206 may make up an antenna heatsink 202. The heatsink 206 may be thermally coupled and secured to the NAD module 210 via the second thermal adhesive layer 208 interposed therebetween. Similar to the first thermal adhesive layer 214, the second thermal adhesive layer 208 may comprise a thermally conductive adhesive material. Examples of the antenna heatsink 202 are provided in FIGS. 7 and 8 and described further below in reference thereto.

The components of the antenna system 200 may be layered as shown in FIG. 2 with a stacking axis parallel with the y-axis. For example, the PCBA 216 may be stacked on top of the base heatsink 218, the NAD module 210 may be stacked on top of the PCBA 216 such that the base heatsink 218 and the NAD module 210 are opposite across the PCBA 216. As used herein, components shown in figures as being on top of another component may be referred to as such, however such descriptions do not indicate a gravitational direction or orientation of the components in relation thereto. Further, the heatsink 206 may be stacked on top of the NAD module 210. Thermal adhesive layers 208, 214 and other fasteners (e.g., solder, conductive adhesive, nonconductive adhesive, screws, etc.) may secure the components of the antenna system 200 together. Further, though not shown in FIG. 2, grounding clips (e.g., the clips 314 and clips 920 of FIGS. 3 and 9, respectively) may electrically couple the antenna heatsink 202 and PCB ground as described further below.

The antenna heatsink 202 may be configured to passively draw heat from one or more components via the heatsink 206. The heat may dissipate from the heatsink 206 and/or through a cooling system thermally coupled to the base heatsink 218 in order to maintain a temperature of the one or more components of the antenna system 200 below a threshold temperature (e.g., 105 degrees C.). By incorporating the antenna heatsink 202 in face sharing contact with the second thermal adhesive layer 208 which couples the NAD module 210 thereto rather than just the first antenna 204 (without the heatsink 206) spaced away from the NAD module 210, a temperature of the NAD module 210 may be reduced. In this way, the antenna heatsink 202 may limit a temperature rise of the NAD module 210, thereby preventing degradation of the NAD module 210.

Figure 7:
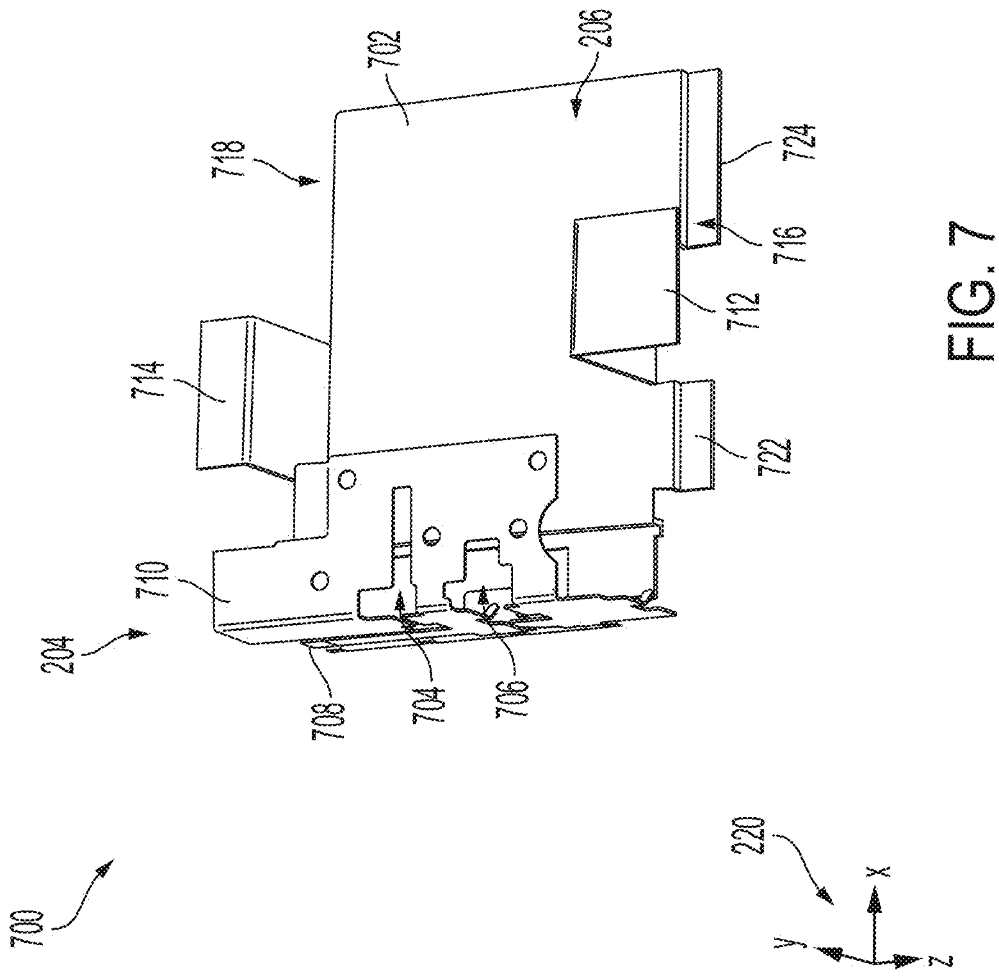
FIG. 7 shows a first example of an antenna heatsink in accordance with one or more embodiments of the present disclosure.

Turning to FIG. 7, an antenna heatsink (e.g., a first example of the antenna heatsink 202 of FIG. 2) is shown in accordance with one or more embodiments of the present disclosure. As described above, the antenna heatsink 700 may be the first antenna 204 formed integrally as a single component with the heatsink 206.

The first antenna 204 may be shaped as a conventional antenna in some examples. For example, the first antenna 204 may be rectangular and bent at an approximately 90 degree angle along an axis parallel with the z-axis such that there is a vertical surface 708 and horizontal surface 710. There may be one or more holes in the first antenna 204. For example, there may be a first hole 704 and a second hole 706. The first hole 704 and the second hole 706 may have different shapes according to a desired antenna function. There may be additional holes included for mechanical assembly of the antenna heatsink 700, for example in the antenna assembly 600 of FIG. 6. The shape of the first antenna 204 and other antennae described herein are exemplary and not limiting as to types, sizes, and shapes of antennae which may be formed integrally with a heatsink such as the heatsink 206 to form an antenna heatsink in accordance with one or more embodiments of the present disclosure.

The heatsink 206 may comprise a base 702 of flat plate (e.g., rectangular) shape protruding approximately perpendicularly from the vertical surface 708 of the first antenna 204. Thus, at least a portion of the first antenna 204 may be perpendicular to the heatsink 206. The heatsink 206 may further comprise a first protrusion 712 and a second protrusion 714 extending approximately perpendicularly from the base 702 and bent along axes parallel with the x-axis at approximately a 90 degree angle such that portions of the first protrusion 712 and the second protrusion 714 are perpendicular surfaces with the base 702, and other portions are in parallel planes to the base 702. The first protrusion 712 and the second protrusion 714 may be on opposite sides of the base 702. For example, the first protrusion may be at a first edge 716 of the base 702 and the second protrusion 714 may be at a second edge of the base 702, wherein the first edge 716 and the second edge 718 are parallel and opposite each other. The first edge 716 and the second edge 718 may be adjacent to (e.g., share common vertices with) a third edge from which the first antenna 204 extends, in at least some examples. The first protrusion 712 and the second protrusion 714 may be tabs included for mechanical support (e.g., structural support) of an antenna assembly such as the antenna assembly 600 of FIG. 6. For example, the first protrusion 712 and the second protrusion 714 may facilitate assembly with the top plate 500 of FIG. 5. Thus, the first protrusion 712 and the second protrusion 714 may be shaped and oriented differently according to a configuration of the top cover.

The heatsink 206 may include further protrusions, for example a third protrusion 722 and a fourth protrusion 724. The third protrusion 722 and the fourth protrusion may be smaller than and extend oppositely from the first protrusion 712 and the second protrusion 714. For example, the first protrusion 712 and the second protrusion 714 may extend in a positive y-direction and the third protrusion 722 and fourth protrusion 724 may extend in a negative y-direction. Further, the third protrusion 722 and the fourth protrusion 724 may also be bent at an approximately 90 degree angle with a bending axis parallel to the first edge 716. The third protrusion 722 and the fourth protrusion 724 may be feet on which the antenna heatsink 202 rests against a PCB (e.g., PCB 302 of FIG. 3). Additionally or alternatively, the third protrusion 722 and the fourth protrusion 724 may be contact points to which grounding clips (e.g., grounding clips 314 of FIG. 3) connect the antenna heatsink 700 to the PCB.

Figure 3:
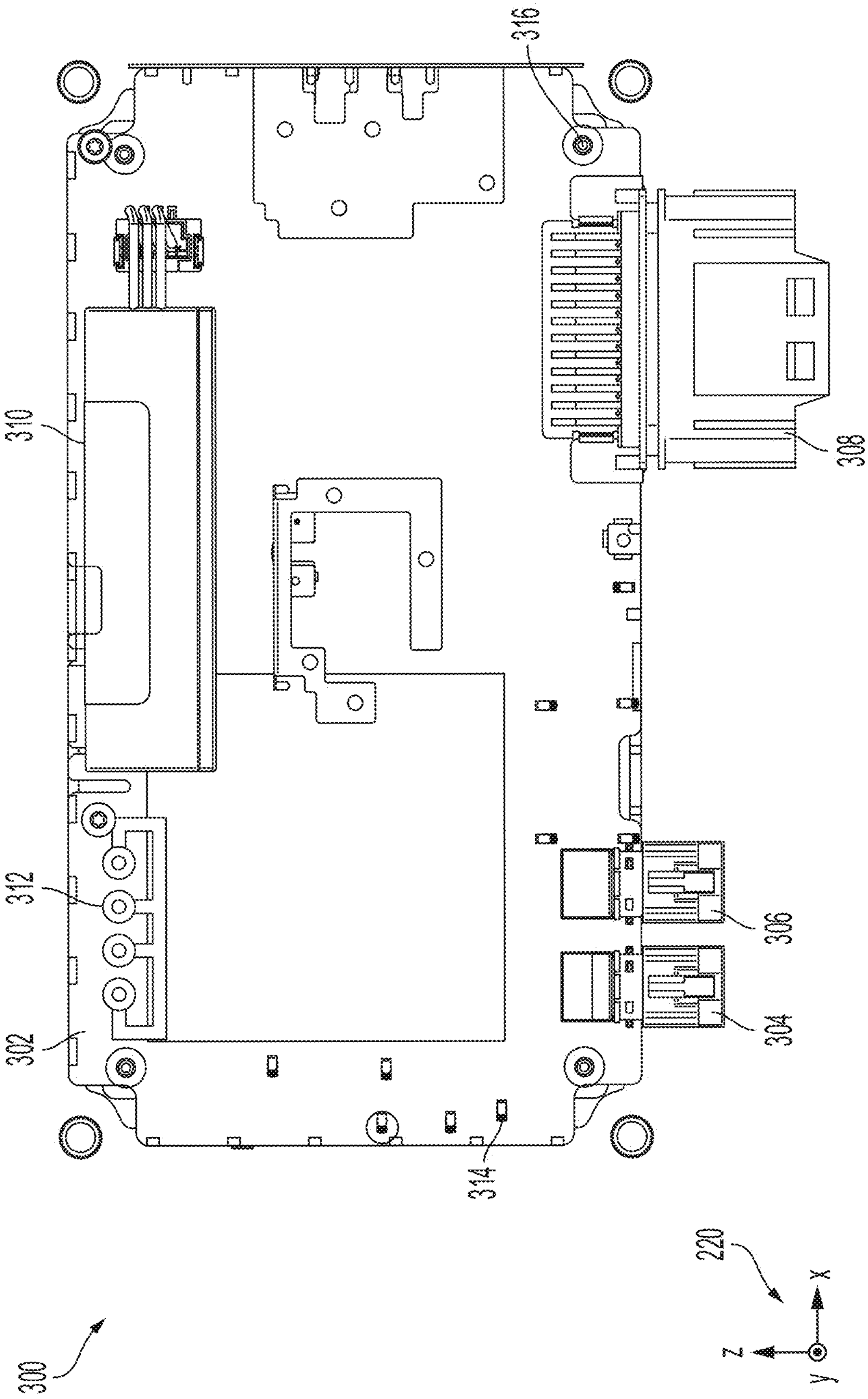
FIG. 3 shows a first example of a printed board circuit assembly (PCBA) of an antenna system in accordance with one or more embodiments of the present disclosure.
Figure 4:
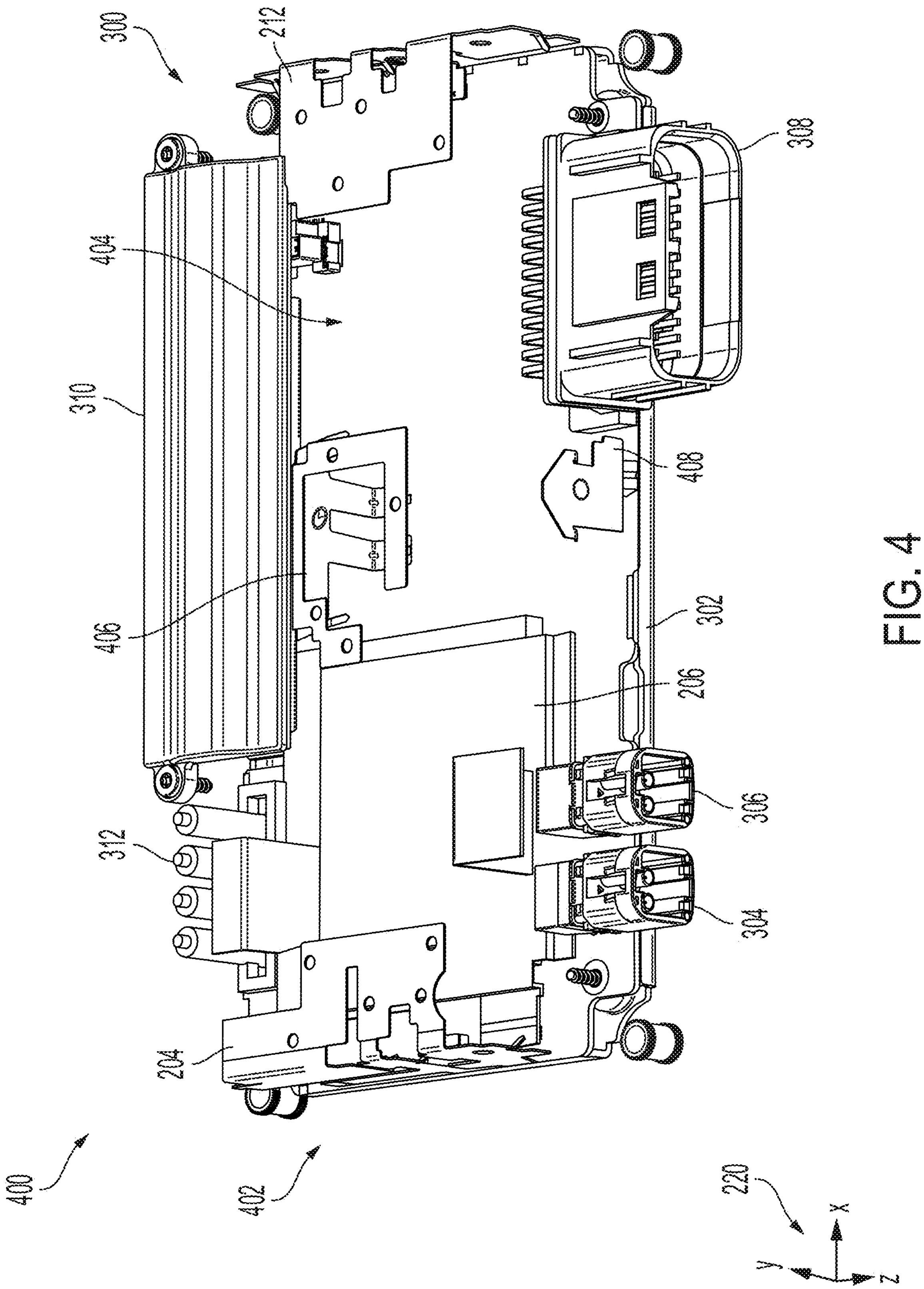
FIG. 4 shows an antenna system in accordance with one or more embodiments of the present disclosure.

Turning to FIG. 3, a PCBA 300 (e.g., a first example of the PCBA 216 of FIG. 2) is shown. The PCBA 300 may include PCB 302, a plurality of clips 314 (e.g., grounding clips and feed clips), and a plurality of electrical components (e.g., one or more electrical components) electrically coupled to and mounted on the PCB 302. For example, the plurality of electrical components may include a first component 304, a second component 306, a third component 308, a fourth component 310, and a fifth component 312. In at least some examples, the plurality of electrical components may make up the modem 50, the processor 52, and/or the memory 54 of the telematics unit 30 in FIG. 1. Further, the plurality of electrical components may include a battery, a light-emitting diode (LED) lens, and connectors for connection with external components. The NAD module 210 may be soldered (e.g., using SMT) to a surface of the PCB 302 (e.g., top surface 404 of FIG. 4). The PCBA 300 may further include a plurality of fasteners 316 (e.g., screws). The fasteners 316 may be used for attaching a top plate (e.g., top plate 500 of FIG. 5) and/or a base heatsink (e.g., base heatsink 1002 of FIG. 10) to the PCBA 300. For example, the PCBA 300 may be interposed between the top plate and the base heatsink when assembled. Additionally or alternatively, the fasteners 316 may connect the PCBA 300 to a vehicle, for example the fasteners 316 may secure the PCBA 300 to a roof of the vehicle.

The plurality of clips 314 may include grounding clips and feed clips. There may be at least one feed clip for each antenna. The grounding clips may ground an antenna heatsink (e.g., the antenna heatsink 202 in FIG. 2) to the PCB 302. In this way, a voltage difference may be reduced between the PCB 302 and the heatsink 206 of FIG. 2, thereby reducing electromagnetic interference emissions from the heatsink 206. The position and/or number of clips 314 may depend on a configuration (e.g., shape, size, number of antennae, etc.) of the antenna heatsink. The clips 314 may couple to the antenna heatsink at one or more points on each of the antennae and the heatsink. For example, the grounding clips of the clips 314 may be arranged about a perimeter of the antenna heatsink. The grounding clips of the clips 314 may allow for electrical tuning of the antenna heatsink such that a desired detection and/or transmission of electromagnetic waves is achieved.

The PCBA 300 shown in FIG. 3 is exemplary and non-limiting. Thus, a PCBA of an antenna system in accordance with the present disclosure may take a variety of other forms. For example, the PCB 302 is shown roughly rectangular; however other shapes may be possible without departing from the scope of the present disclosure. Further, a different number or arrangement of the plurality of grounding clips 314 may be included. Additionally or alternatively, the PCBA 216 may include further components not shown in FIG. 3.

As described above, an antenna heatsink according to one or more embodiments of the present disclosure (e.g., the antenna heatsink 700 of FIG. 7, the antenna heatsink 802 of FIG. 8, or any other exemplary antenna heatsink) may be coupled to a PCBA such as the PCBA 300 of FIG. 3 to form an antenna system. For example, turning to FIG. 4, an antenna system 400 is shown, including the PCBA 300 shown in FIG. 3, and an antenna heatsink 402, which is a second example of the antenna heatsink 202 schematically depicted in FIG. 2. The antenna system 400 may further include the second antenna 212 schematically depicted in FIG. 2.

The antenna heatsink 402 may comprise the heatsink 206, the first antenna 204, and a third antenna 406. The heatsink 206, the first antenna 204, and the third antenna 406 may be integrally formed as a single component, in at least some examples. In other examples, the heatsink 206 and one or more antennae (e.g., the first antenna 204 and the third antenna 406) may be appropriately coupled (e.g., electrically and thermally coupled) and positioned in face sharing contact.

The antenna heatsink 402 may be coupled to a top surface 404 of the PCB 302 with the heatsink 206 parallel with the PCB 302. The first component 304, the second component 306, the third component 308, the fourth component 310, and the fifth component 312 may also be coupled to the top surface 404. Further, there may be additional and/or alternative components coupled to the top surface 404 and/or a bottom surface facing opposite the top surface 404.

The first antenna 204 may extend down a side of the PCB 302 and bend perpendicularly over the top of the PCB 302 such that a portion of the first antenna 204 is parallel with and spaced away from the top surface 404. Similarly, the second antenna 212 may extend down a second side opposite the first side and bend perpendicularly over the top of the PCB 302. The third antenna 406 may be roughly planar in shape and positioned on the top surface 404 extending laterally from the heatsink 206.

An antenna system of a conformal antenna assembly according to one or more embodiments of the present disclosure (e.g., the antenna system 400) may include one or more antennae, wherein at least one of the one or more antennae is formed integrally with a heatsink to construct an antenna heatsink. Thus, in at least some examples, one or more antennae of the antenna system may be separate from the antenna heatsink. For example, the antenna system 400 may further include a fourth antenna 408, wherein the fourth antenna 408 is spaced away from the antenna heatsink 402.

The first antenna 204, the third antenna 406, and the fourth antenna 408 may serve different antenna functions (e.g., for receiving and transmitting signals within different telecommunications systems). For example, the first antenna 204 may be a fifth generation technology (5G) antenna, the third antenna 406 may be a global navigation satellite system (GNSS) antenna, and the fourth antenna 408 may be a wireless local area networks (WLAN) antenna. The heatsink 206 may reduce a temperature of an NAD module (e.g., the NAD module 210 of FIG. 2) or other module by increasing a cooling area (e.g., surface area of heatsink 206). In this way, the antenna heatsink 402 may provide antenna functions (e.g., receive and transmit electromagnetic signals for communication within networks such as the GNSS, WLAN, etc.) and thermal regulation of the antenna system 400 (e.g., maintain temperature of components such as the NAD module below the threshold temperature).

Figure 8:
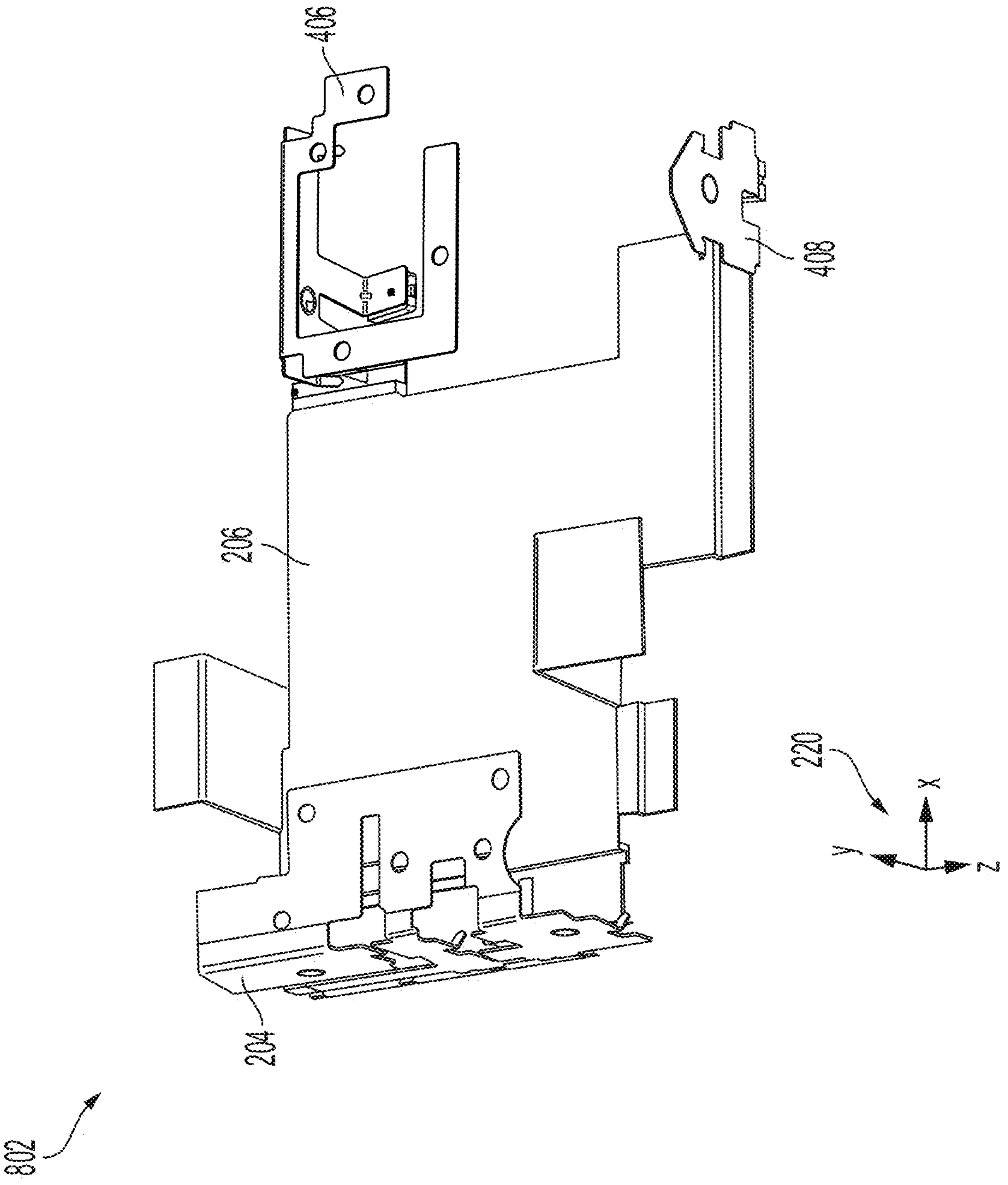
FIG. 8 shows a second example of an antenna heatsink in accordance with one or more embodiments of the present disclosure.

Turning to FIG. 8, an antenna heatsink 802 (e.g., a third example of the antenna heatsink 202) schematically represented in FIG. 2 is shown. The antenna heatsink 802 may comprise the first antenna 204, the heatsink 206, the third antenna 406, and the fourth antenna 408 formed integrally as a single component. Compared to the antenna heatsink 402 of FIG. 4, the heatsink 206 may extend laterally further (e.g., in the negative z-direction) to reach a desired relative location of the fourth antenna 408. Such an example demonstrates the heatsink 206 may be shaped according to a demanded spacial configuration of the one or more antennae, in addition to a desired heat transfer area (e.g., surface area of the heatsink 206) through which heat may dissipate (e.g., from an NAD module thermally coupled to the antenna heatsink 802) via the heatsink 206.

Figure 9:
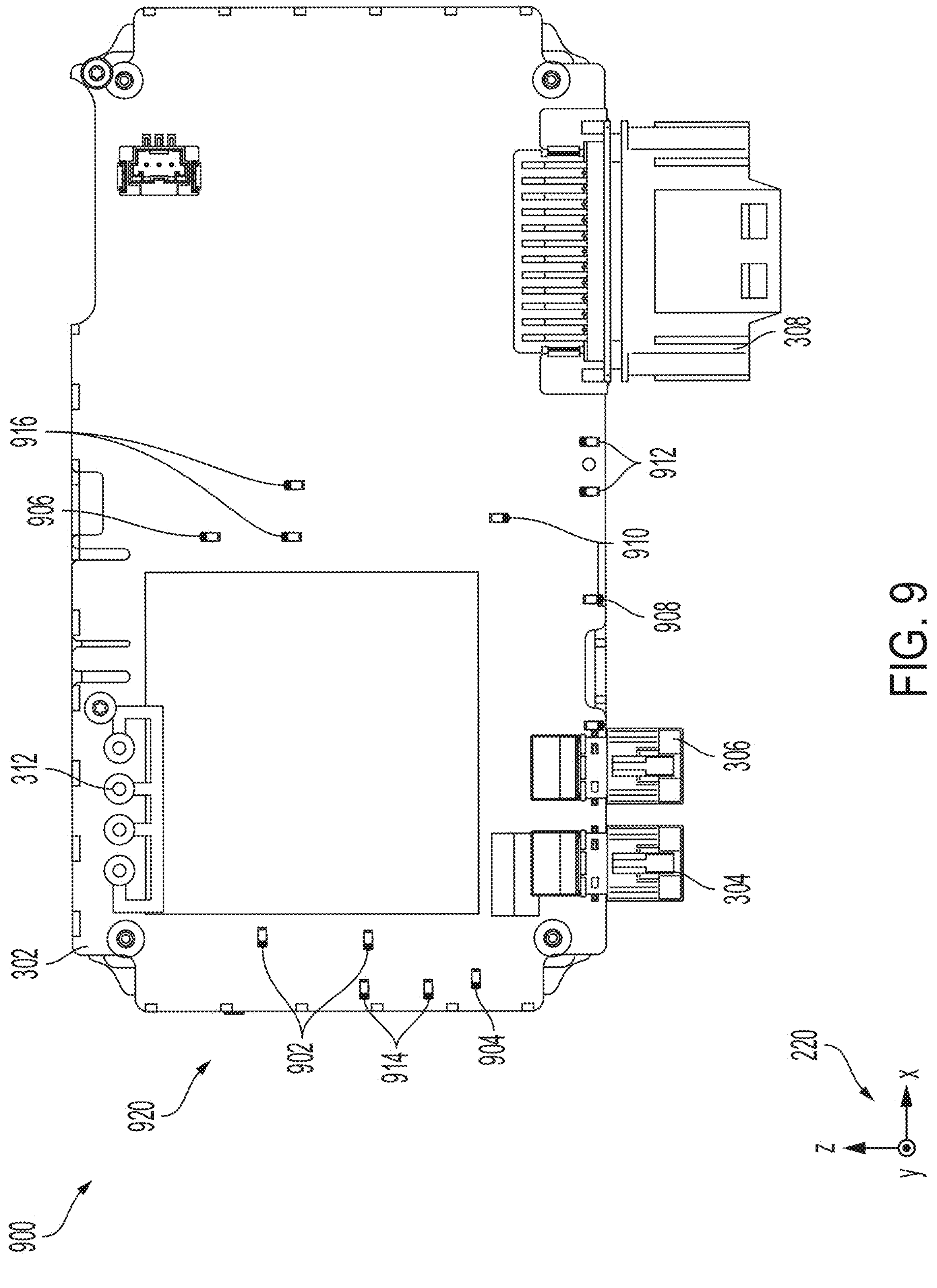
FIG. 9 shows a second example of a PCBA in accordance with one or more embodiments of the present disclosure.

A PCBA 900 (e.g., a second example of the PCBA 216) is shown in FIG. 9. The PCBA 900 includes some of the same components as the PCBA 300 of FIG. 3 (e.g., the PCB 302, the fifth component 312, the first component 304, the second component 306, the third component 308). However, the PCBA 900 may not include all of the components included in the PCBA 300. The PCBA 900 may be another example of a PCBA which may couple to an antenna heatsink to form an antenna system, however other examples may be used without departing from the scope of this disclosure. For example, additional or alternative electrical components may be included in a PCBA.

Further, the arrangement and number of clips 920, including grounding clips and feed clips, may depend on a configuration of an antenna heatsink which couples to the PCBA. For example, an antenna heatsink comprising a greater number of antenna and/or having a greater surface area may demand more clips. Relative positions of the antennae of the antenna heatsink may correspond to an arrangement of grounding clips.

For example, the PCBA 900 may be adapted to electrically couple to the antenna heatsink 802 of FIG. 8. As such, the clips 920 may be arranged according to the configuration of the antenna heatsink 802 shown in FIG. 8. For example, the clips 920 may include a first set 902, a second set 904, a third set 906, a fourth set 908, a fifth set 910, a sixth set 912, a seventh set 914, and an eighth set 916, wherein each of the aforementioned sets includes one or more clips (e.g., grounding clips and feed clips) adapted to electrically couple to the antenna heatsink 802 of FIG. 8.

Referencing FIGS. 8 and 9, when the antenna heatsink 802 is positioned relative to the PCBA 900 in an antenna assembly, the sixth set 912 may electrically couple to the fourth antenna 408, the seventh set 914 may electrically couple to the first antenna 204, and the eighth set 916 may electrically couple to the third antenna 406. As such, the sixth set 912, the seventh set 914, and the eighth set 916 may be positioned similarly to a conventional antenna assembly including the same antenna configuration. The sixth set 912, the seventh set 914, and the eighth set 916 may each include at least one feed clip and at least one grounding clip. In other examples, the grounding clips may be arranged differently. In addition, the antenna assembly disclosed herein may include grounding clips adapted to electrically couple to the heatsink 206. For example, the first set 902, the second set 904, the third set 906, the fourth set 908, and the fifth set 910 may include grounding clips electrically coupled to the heatsink 206. The first set 902, the second set 904, the third set 906, the fourth set 908, and the fifth set 910 may be arranged along a perimeter of the heatsink 206. The number and positioning of the grounding clips may be selected to tune the electrical performance of the antenna heatsink 802. For example, the heatsink 206 may generate a new resonant frequency band and the distribution of grounding clips may tune the new resonant frequency band as an antenna function. Thus, the number and positioning of grounding clips may depend on a size and shape of the heatsink 206. In this way, the antennae (e.g., the first antenna 204, the third antenna 406, and the fourth antenna 408) of the antenna heatsink 802 may perform with approximately the same efficiency (e.g., strength of radiated electromagnetic field compared to power provided) over a range of frequencies as the same antennae without the heatsink 206 (e.g., in conventional antenna assemblies).

Figure 5:
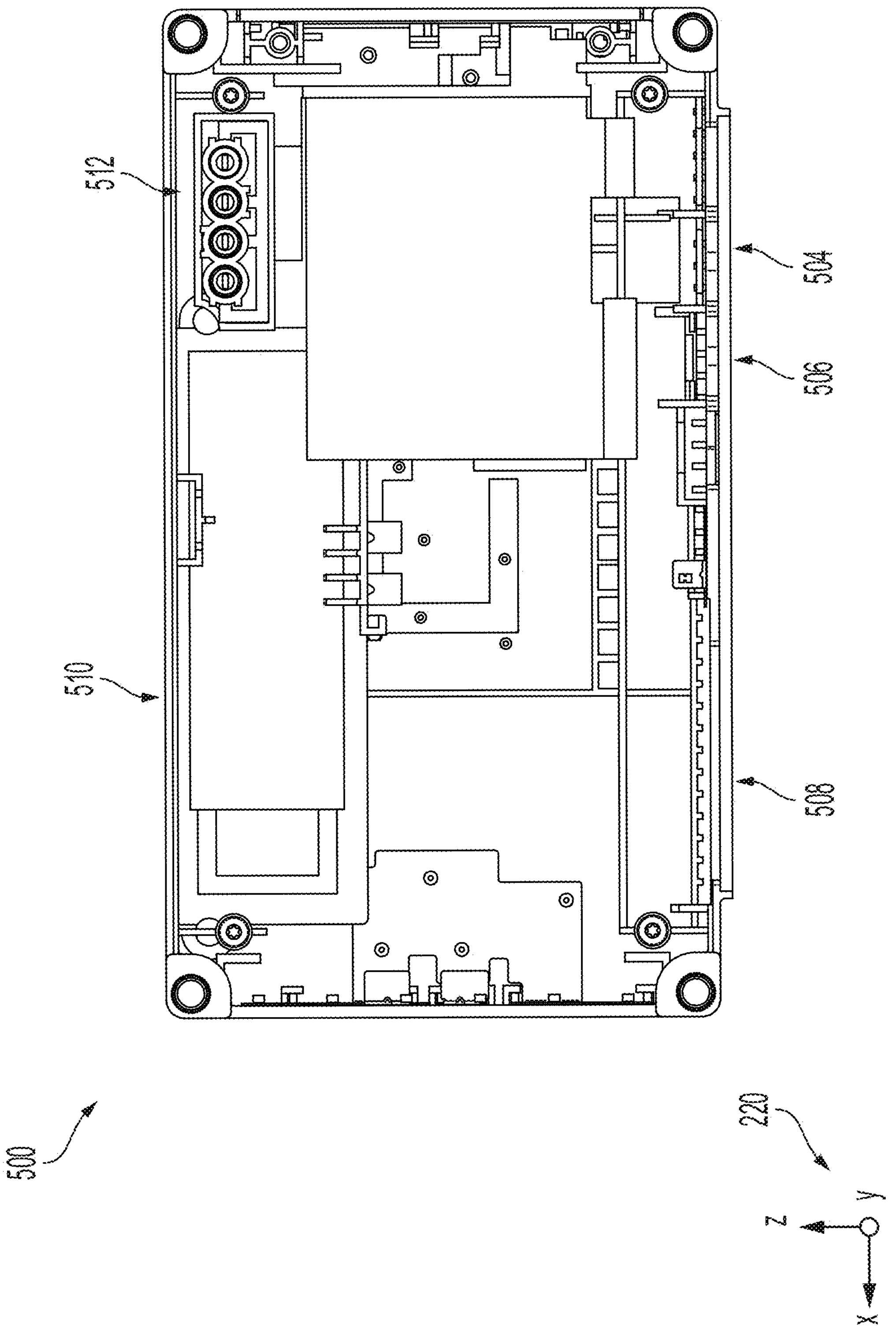
FIG. 5 shows a top plate of an antenna assembly in accordance with one or more embodiments of the present disclosure.

Turning to FIG. 5, an example of a top plate 500 is shown in accordance with one or more embodiments of the present disclosure. The top plate 500 may be used to cover an antenna system, such as the antenna system 400 of FIG. 4. As such, geometry of the top plate 500 may depend on a configuration of the PCBA 300. For example, the top plate 500 may include a first portion 504 adapted to at least partially cover the first component 304, a second portion 506 adapted to at least partially cover the second component 306, a third portion 508 adapted to at least partially cover the third component 308, a fourth portion 510 adapted to at least partially cover the fourth component 310, and a fifth portion 512 adapted to at least partially cover the fifth component 312. In other examples, the top plate 500 may be shaped differently to accommodate (e.g., at least partially cover) different components and/or different spacial arrangements of the components. Further, some components, such as connection ports, may be left at least partially exposed (e.g., exterior of the top cover).

Figure 6:
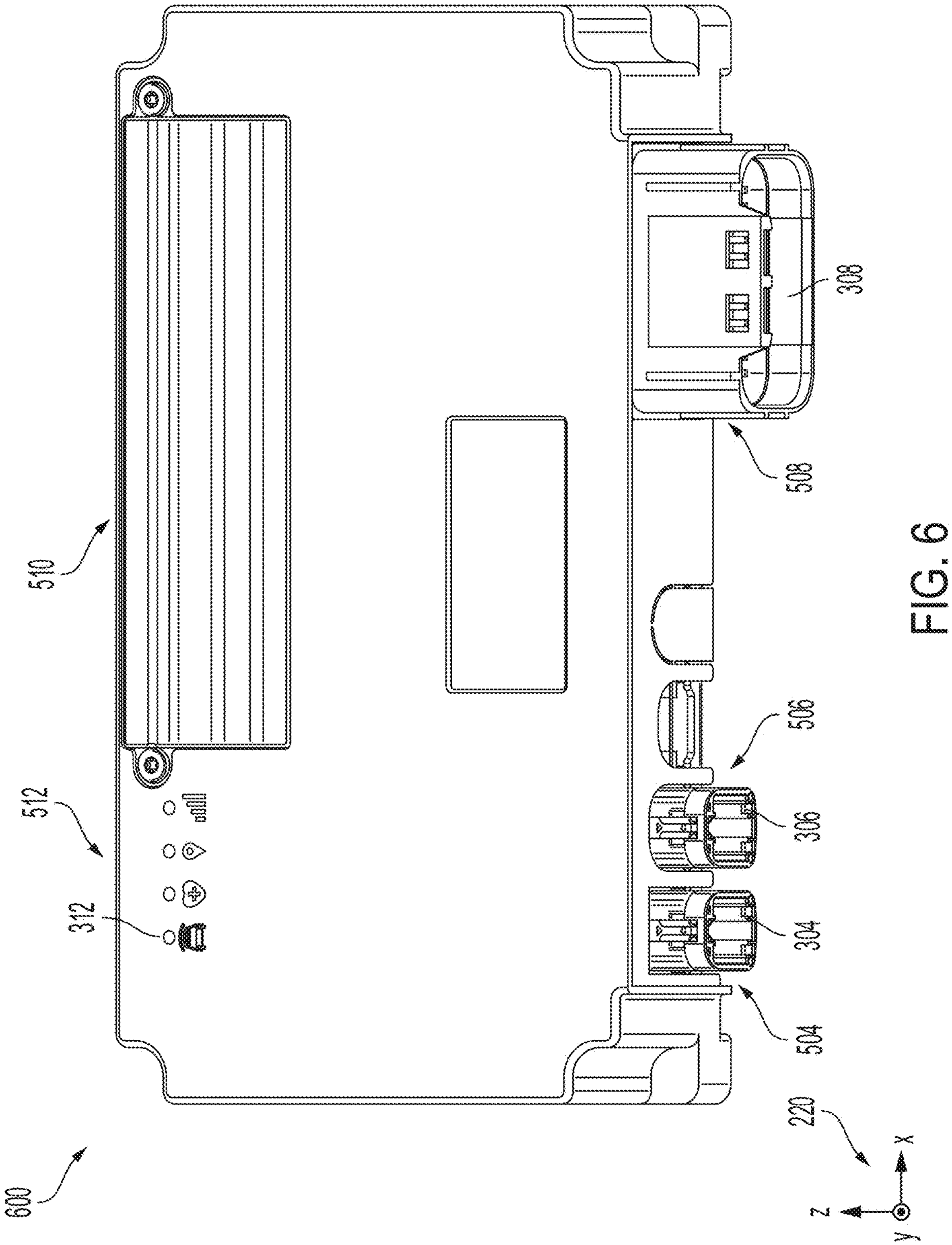
FIG. 6 shows an antenna assembly in accordance with one or more embodiments of the present disclosure.

Turning to FIG. 6, an example of an antenna assembly 600 is shown in accordance with one or more embodiments of the present disclosure. The antenna assembly 600 may include an antenna system (e.g., the antenna system 400 of FIG. 4, or the antenna heatsink 802 of FIG. 8 coupled to the PCBA 900 of FIG. 9) and a top plate (e.g., the top plate 500). The top plate 500 may be placed over the top of the antenna system 400 to protect the antenna system 400 from wear. The top plate 500 may be secured to the antenna system 400 by hot-melting, snap-fit, press-fit, adhesive, one or more fasteners (e.g., screws), and/or the like.

The antenna assembly 600 may further comprise a base heatsink 1002 thermally coupled to the bottom (e.g., the surface facing the negative y-direction) of the antenna assembly 600, opposite the top plate 500 across the antenna system 400 as shown in a bottom view 1000 in FIG. 10. The base heatsink 1002 may be an embodiment of the base heatsink 218 schematically shown in FIG. 2. The base heatsink 1002 may be a conventional heatsink configured for use in an antenna system with or without an antenna heatsink.

Turning briefly to FIG. 11, the antenna assembly 600 may be positioned in a roof 1102 (e.g., within or underneath the roof) of a vehicle 1100 without protruding vertically (e.g., in a positive y-direction) therefrom. A configuration of electrical components demanded to achieve the conformal nature of the antenna assembly 600 may result in higher power through one or more components. In this way, the one or more components of the antenna assembly 600 (e.g., NAD module) may be subject to higher temperatures. The position shown in FIG. 11 is exemplary and non-limiting as to a position of the antenna assembly of the present disclosure in a vehicle. For example, the antenna assembly may be positioned in a different area of the roof, in the dashboard, spoiler, or other locations without departing from the scope of the present disclosure. Further, the antenna assembly may be positioned within a different system than a vehicle.

Returning to FIG. 6, the base heatsink 1002 may cover a bottom of the antenna system and allow heat to concentrate in the base heatsink 1002 rather than in the electrical components of the antenna system. The base heatsink 1002 alone may not be able to maintain a temperature of components of the antenna assembly below the threshold temperature. However, with an antenna heatsink of the present disclosure (e.g., the antenna heatsink 700 of FIG. 7, the antenna heatsink 402 of FIG. 4, or the antenna heatsink 802 of FIG. 8), a temperature of the components may be further reduced.

The technical effect of the antenna assembly with antenna heatsink disclosed herein is to maintain a temperature of one or more components of the antenna assembly below a threshold temperature. The antenna heatsink may be positioned to reduce a temperature increase of components prone to heating due to high power throughput (e.g., an NAD module or other module). Thus, the antenna assembly disclosed herein may be less susceptible to overheating than other antennae, thereby reducing (e.g., preventing) degradation of the antenna assembly due to one or more components thereof such as an NAD module experiencing temperatures over the threshold temperature.

The disclosure also provides support for an antenna system, comprising: a printed circuit board (PCB) assembly comprising a PCB and one or more electrical components mounted thereon, a network access device (NAD) module soldered to the PCB, and an antenna heatsink comprising a first antenna integrally formed with a heatsink, the antenna heatsink coupled to a first side of the PCB via clips and coupled to the NAD module via a first thermal adhesive layer interposed therebetween, wherein the clips include grounding clips and feed clips. In a first example of the system, the antenna system further comprises a base heatsink secured to a second side of the PCB via a second thermal adhesive layer interposed therebetween, wherein the second side is opposite the first side. In a second example of the system, optionally including the first example, a number and positioning of the grounding clips depend on a size and shape of the antenna heatsink. In a third example of the system, optionally including one or both of the first and second examples, the antenna heatsink further comprises a second antenna formed integrally with the heatsink and the first antenna, and wherein the first antenna is a 5G antenna and the second antenna is a GNSS antenna. In a fourth example of the system, optionally including one or more or each of the first through third examples, the antenna heatsink further comprises a third antenna formed integrally with the heatsink, the first antenna, and the second antenna, and wherein the third antenna is a WLAN antenna. In a fifth example of the system, optionally including one or more or each of the first through fourth examples, the grounding clips allow for electrical tuning of the antenna system. In a sixth example of the system, optionally including one or more or each of the first through fifth examples, the antenna system further comprises one or more antennae spaced away from the heatsink. In a seventh example of the system, optionally including one or more or each of the first through sixth examples, the antenna system is adapted to be included in a conformal antenna assembly mounted within a roof of a vehicle.

The disclosure also provides support for a conformal antenna assembly, comprising: an antenna heatsink comprising one or more antennae formed integrally with a heatsink, the antenna heatsink adapted to send and receive wireless signals and reduce a temperature of the conformal antenna assembly, and a printed circuit board (PCB) with a network access device (NAD) module soldered thereon and clips electrically coupling the PCB to the antenna heatsink at one or more points on each of the one or more antennae and the heatsink, the clips including grounding clips and feed clips. In a first example of the system, the system further comprises: a top plate adapted to cover the antenna heatsink and the PCB. In a second example of the system, optionally including the first example, the system further comprises: a base heatsink thermally coupled to the PCB opposite the top plate. In a third example of the system, optionally including one or both of the first and second examples, a number and location of the grounding clips depends on a configuration of the antenna heatsink. In a fourth example of the system, optionally including one or more or each of the first through third examples, the conformal antenna assembly is adapted to be positioned within or underneath a roof of a vehicle without extending vertically from a top of the roof. In a fifth example of the system, optionally including one or more or each of the first through fourth examples, the heatsink maintains the temperature of one or more components of the conformal antenna assembly, including the NAD module, below a threshold temperature.

The disclosure also provides support for an antenna assembly, comprising: a printed circuit board (PCB), a base heatsink coupled to a bottom surface of the PCB by a layer of thermal adhesive interposed therebetween, a network access device (NAD) module soldered to a top surface of the PCB, wherein the top surface faces opposite the bottom surface, an antenna heatsink comprising a heatsink formed integrally with a first antenna, wherein the heatsink is a flat plate parallel with the top surface and at least a portion of the first antenna is perpendicular to the heatsink, and wherein the first antenna is mounted on the top surface and the heatsink is coupled to the NAD module via a second layer of thermal adhesive interposed therebetween and grounded to the PCB by a plurality of grounding clips. In a first example of the system, the plurality of grounding clips is arranged along a perimeter of the heatsink and at one or more points on the first antenna. In a second example of the system, optionally including the first example, the base heatsink is adapted to reduce a temperature of the antenna assembly and the antenna heatsink is adapted to further reduce the temperature of the NAD module. In a third example of the system, optionally including one or both of the first and second examples, the antenna assembly further comprises a second antenna mounted on the PCB, wherein the second antenna is spaced away from the antenna heatsink and the NAD module. In a fourth example of the system, optionally including one or more or each of the first through third examples, the second antenna is a main antenna and the first antenna is a diversity antenna. In a fifth example of the system, optionally including one or more or each of the first through fourth examples, the antenna assembly is adapted to be positioned within or underneath a roof of a vehicle without extending vertically from a top of the roof.

The foregoing descriptions are merely example embodiments adopted to illustrate the principles of the present application, and are not used to limit the protection scope of the present application. For those of ordinary skill in the art, various modifications and improvements can be made without departing from the spirit and essence of the present application, and these modifications and improvements are also within the protection scope of the present application.

As used in this application, an element or step recited in the singular and preceded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. An antenna assembly, comprising:

a printed circuit board (PCB);

a base heatsink coupled to a bottom surface of the PCB by a layer of thermal adhesive interposed therebetween;

a network access device (NAD) module soldered to a top surface of the PCB, wherein the top surface faces opposite the bottom surface; and an antenna heatsink comprising a heatsink formed integrally with a first antenna, wherein the heatsink is a flat plate parallel with the top surface and at least a portion of the first antenna is perpendicular to the heatsink, and wherein the first antenna is mounted on the top surface and the heatsink is coupled to the NAD module via a second layer of thermal adhesive interposed therebetween and grounded to the PCB by a plurality of grounding clips.

2. The antenna assembly of claim 1, wherein the plurality of grounding clips is arranged along a perimeter of the heatsink and at one or more points on the first antenna.

3. The antenna assembly of claim 1, wherein the base heatsink is adapted to reduce a temperature of the antenna assembly and the antenna heatsink is adapted to further reduce the temperature of the NAD module.

4. The antenna assembly of claim 1, wherein the antenna assembly further comprises a second antenna mounted on the PCB, wherein the second antenna is spaced away from the antenna heatsink and the NAD module.

5. The antenna assembly of claim 4, wherein the second antenna is a main antenna and the first antenna is a diversity antenna.

6. The antenna assembly of claim 1, wherein the antenna assembly is adapted to be positioned within or underneath a roof of a vehicle without extending vertically from a top of the roof.

* * * * *